United States Patent
de Jesus et al.

(10) Patent No.: US 7,591,622 B2
(45) Date of Patent: Sep. 22, 2009

(54) NUTMOUNT APPARATUS

(75) Inventors: Horacio B. de Jesus, Hungtington Beach, CA (US); Elio Dalmau, La Crescenta, CA (US)

(73) Assignee: The Boeing Company, Chicago, IL (US)

( * ) Notice: Subject to any disclaimer, the term of this patent is extended or adjusted under 35 U.S.C. 154(b) by 325 days.

(21) Appl. No.: 11/188,028

(22) Filed: Jul. 22, 2005

(65) Prior Publication Data
US 2009/0010704 A1    Jan. 8, 2009

(51) Int. Cl.
*F16B 39/284* (2006.01)
*F16B 37/04* (2006.01)

(52) U.S. Cl. .................. 411/111; 411/113; 411/181; 411/108; 411/183

(58) Field of Classification Search .......... 411/111, 411/113, 181, 108, 183
See application file for complete search history.

(56) References Cited

U.S. PATENT DOCUMENTS

| | | | |
|---|---|---|---|
| 468,598 A | | 2/1892 | Dickey |
| 1,038,834 A | * | 9/1912 | Bloom ................. 411/24 |
| 3,076,668 A | * | 2/1963 | Famely ............... 285/137.11 |
| 4,621,961 A | * | 11/1986 | Gulistan .............. 411/352 |
| 4,732,518 A | * | 3/1988 | Toosky ................ 411/181 |
| 4,732,519 A | * | 3/1988 | Wagner ............... 411/337 |
| 4,911,417 A | * | 3/1990 | Short .................. 267/256 |
| 4,964,594 A | * | 10/1990 | Webb .................. 244/131 |
| 5,103,548 A | | 4/1992 | Reid et al. |
| 5,245,743 A | | 9/1993 | Landy et al. |
| 5,380,136 A | * | 1/1995 | Copple et al. ......... 411/183 |
| 5,405,228 A | * | 4/1995 | Reid et al. ........... 411/183 |
| 5,468,104 A | * | 11/1995 | Reid et al. ........... 411/113 |
| 5,632,582 A | * | 5/1997 | Gauron ................ 411/82.1 |
| 6,077,010 A | * | 6/2000 | Reid et al. ........... 411/107 |
| 6,183,180 B1 | * | 2/2001 | Copple et al. ......... 411/107 |
| 6,910,539 B2 | | 6/2005 | Carter |
| 7,059,816 B2 | * | 6/2006 | Toosky ................ 411/181 |
| 7,114,900 B2 | * | 10/2006 | Toosky ................ 411/108 |
| 7,237,314 B2 | * | 7/2007 | Toosky ................ 29/525.02 |
| 2003/0091408 A1 | * | 5/2003 | Toosky ................ 411/181 |
| 2005/0025606 A1 | * | 2/2005 | Toosky ................ 411/181 |
| 2005/0117994 A1 | * | 6/2005 | Toosky ................ 411/181 |

FOREIGN PATENT DOCUMENTS

| | | | |
|---|---|---|---|
| DE | 2217490 | | 4/1972 |
| GB | 2197047 A | | 9/1987 |
| GB | 2428762 A | * | 2/2007 |
| WO | 03/042551 | | 5/2003 |

* cited by examiner

*Primary Examiner*—Victor Batson
*Assistant Examiner*—David C Reese
(74) *Attorney, Agent, or Firm*—Rozenblat IP LLC

(57) ABSTRACT

A nutmount apparatus includes a sleeve, a bushing insertable into the sleeve and a nut. The nutmount apparatus may further include a nut retainer for holding an internally threaded nut. The nutmount apparatus may be used, in conjunction with a threaded screw or bolt, to secure a first structure, such as an aircraft wall or cover panel, to a second structure, such as an aircraft frame.

15 Claims, 4 Drawing Sheets

NUTMOUNT APPARATUS

STATEMENT OF GOVERNMENT RIGHTS

This invention was made with Government support under contract number F33657-01-C-0047, awarded by the U.S. Air Force. The government has certain rights in this invention.

FIELD OF INVENTION

This invention relates to a nutmount apparatus for securing two structures together, and more particularly to a nutmount apparatus used to secure aircraft parts or the like.

BACKGROUND

Nutmounts are used in combination with a threaded screw or bolt to secure a first structure, such as an aircraft wall or cover panel, to a second structure, such as an aircraft frame. Nutmounts are typically secured about a nutmount hole in a first aircraft structure, and an anchor nut is secured to the nutmount. Nutmounts often employ rivets for securement within an installation hole. After the nutmount is in position, a threaded bolt is inserted through the second aircraft structure, through the nutmount hole in the first aircraft structure, and through a bolt-receiving hole in the nutmount. The threaded bolt is screwed into the anchor nut and tightened to secure the two members together.

In the aircraft industry, as in many other labor-intensive industries, every manufacturing step that is performed manually increases the time required as well as the expense involved in assembling an aircraft, and it also introduces the potential for worker error. There is a need for an easy-to-use nutmount that can be used with or without rivets, while avoiding departure from an installation hole.

SUMMARY OF THE INVENTION

The present invention concerns an improved nutmount apparatus and method. The nutmount apparatus seeks to simplify the anchor nut mounting and removal process, thereby reducing the time, effort, and expense required for securing structural members together. In one aspect, the nutmount apparatus of the present invention may be used with or without rivets. In another aspect, the present invention does not require the use of expansion tools, swaging tools or adhesives, though these implements may be employed without departing from the spirit of the present invention.

In one embodiment, the nutmount apparatus of the present invention comprises a sleeve including a central channel and a first diameter, a bushing comprising a tapered end for insertion into the central channel and a portion spaced apart from the tapered end and an internally threaded nut positioned at an end of the sleeve or bushing. The portion of the bushing spaced apart from the tapered end may include a second diameter that exceeds the first diameter. In select embodiments, the first diameter may be between about 0.3060 inches and 0.625 ches and the second diameter may be between about 0.185 inches to about 0.562 ches. The bushing may further comprise opposing projections, each projection including a recess engageable with a retainer for receiving an internally threaded nut.

In another embodiment, a method of using the nutmount apparatus of the present invention to secure two structures comprises the steps of providing a sleeve including a central channel and a first diameter, inserting a bushing comprising a tapered end and portion spaced apart from the tapered end into the sleeve, wherein the portion of the bushing includes a second diameter that exceeds the first diameter of the sleeve, inserting the sleeve into an opening within one of the two structural members and securing the two structural members together by, for example, using a threaded bolt. The sleeve may be inserted into the hole before or after the bushing is inserted into the sleeve. In either case, when the bushing is inserted into the sleeve, an interference fit between the portion of the bushing spaced apart from the tapered end and the sleeve may be created. To secure the structures together, a threaded bolt or screw may be screwed into a nut carried by the bushing.

BRIEF DESCRIPTION OF THE DRAWINGS

Certain embodiments of the presently claimed invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

DETAILED DESCRIPTION

Figure 1A:
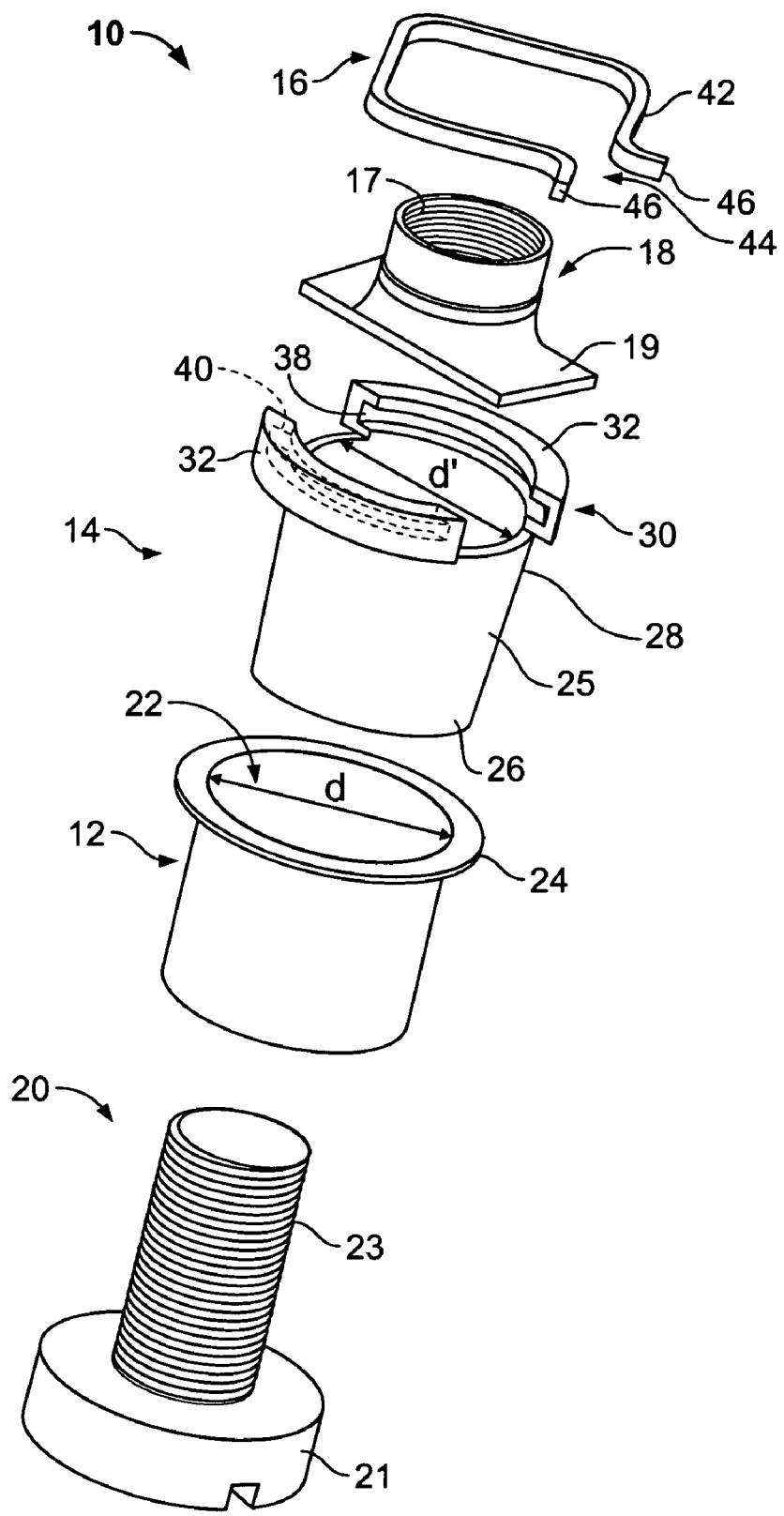
FIG. 1A is an exploded view of one embodiment of the nutmount apparatus of the present invention.
Figure 2:
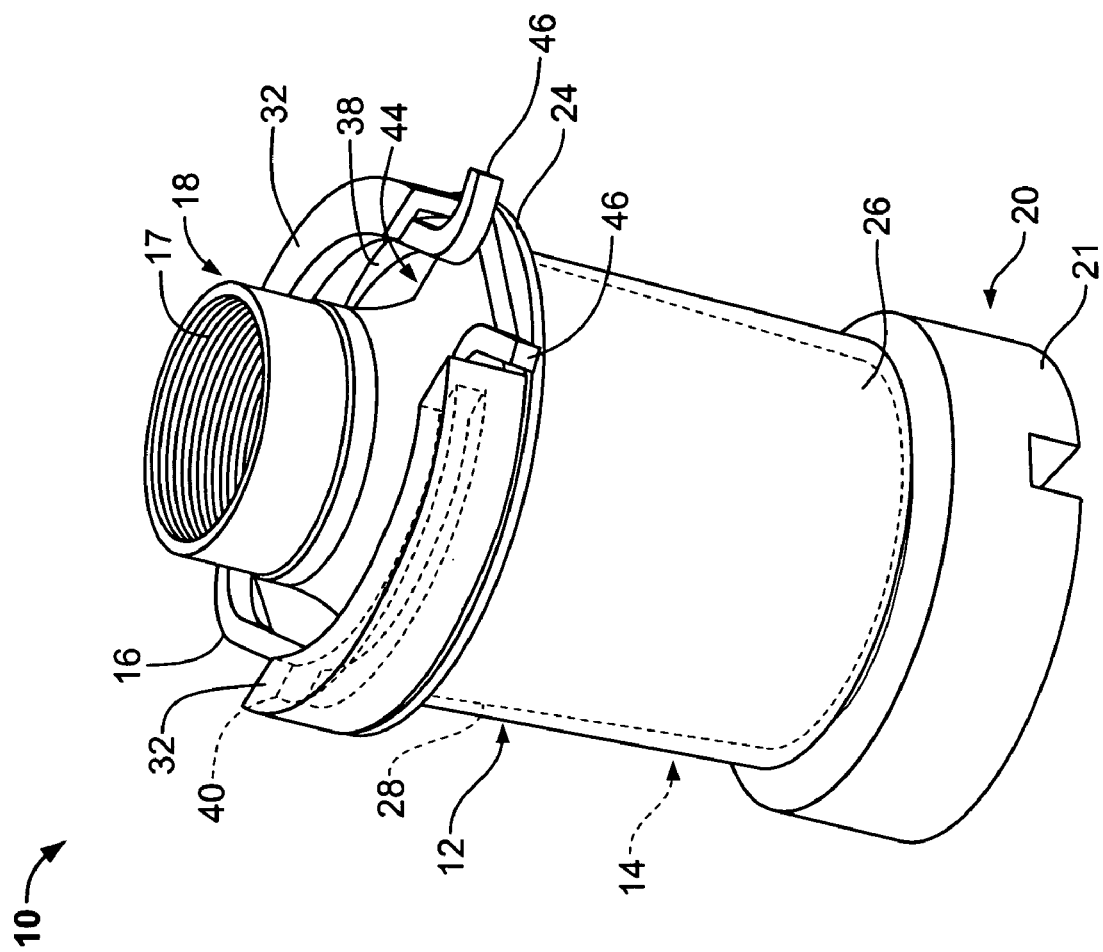
FIG. 2 is a blown-up perspective assembled view of the nutmount apparatus of FIG. 1.
Figure 1B:
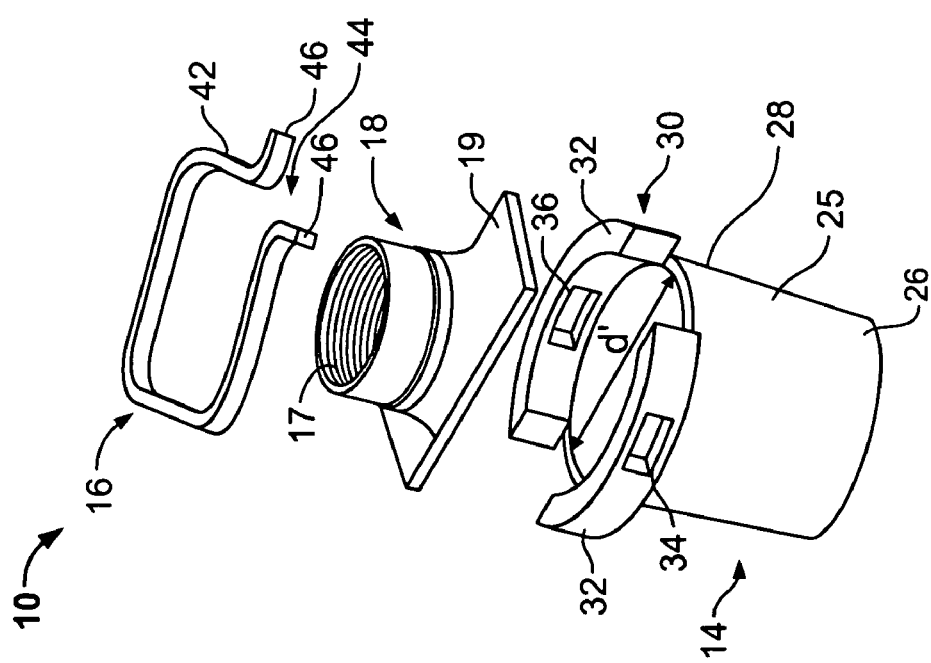
FIG. 1B is an exploded unassembled perspective view of the bushing and nut element of FIG. 1.

Referring now to FIGS. 1A, 1B and 2, one embodiment of the nutmount apparatus 10 of the present invention is shown. Nutmount apparatus 10 comprises sleeve 12, bushing 14, nut retainer 16 and nut element 18. Nutmount apparatus 10 is typically used in conjunction with threaded bolt or screw 20.

Sleeve 12 is typically annular in shape and comprises central channel 22 and flange 24. Sleeve 12 may be between about 0.050 inches and about 0.50 inches in length and include first diameter d between about 0.150 inches and 0.625 inches and more particularly between about 0.3108 inches and 0.562 inches. Thickness of sleeve 12 may be between about 0.005 inches about 0.125 inches.

Bushing 14 comprises tapered end 26, portion 28 spaced apart from tapered end 26, and opposing projections 32. Bushing may be between about 0.050 inches and about 0.500 inches in length. Tapered end 26 may be angled inward from portion 25 at angles within the range of about 3.0° and about 45.0°. Portion 28 includes second diameter d' that exceeds first diameter d. Second diameter d' may be between about 0.185 inches to about 0.562 inches. Opposing projections 32 may be positioned at or near a front portion or rear portion of bushing 14. In one embodiment, opposing projections 32 carry first and second recesses 38 and 40, which may be positioned on opposing internal surfaces of opposing projections 32. In another embodiment, opposing projections carry first and second slots or windows 34 and 36, which may be positioned on opposing surfaces of opposing projections 32.

Nut retainer 16 is adapted to hold nut 18 in place. Nut retainer 16 comprises flexible sidewalls 42, open portion 44 and dual ends 46. Nut retainer 16 typically takes the form of an arc wire. When nut 18 is being positioned within retainer 16, at least a portion of flexible sidewalls 42 expand and then contract around an external surface of nut 18.

Nut element 18 comprises open internally threaded portion 17 and base 19. Open internally threaded portion 17 typically comprises a diameter between about 0.180 inches and 0.375 inches.

Threaded bolt or screw 20, used in conjunction with nutmount apparatus 10, is adapted to engage open internally threaded portion 17. Threaded bolt or screw 20 includes head 21 and threaded shaft 23. Threaded bolt or screw 20 typically comprises a diameter between about 0.180 inches and 0.375 inches.

The various components of nutmount apparatus 10 may be made through different processes. Sleeve 12 may be extruded and is typically constructed of stainless steel or an aluminum alloy. One embodiment of sleeve 12 may be made by Click Bond, Inc. of Carson City, Nev. Bushing 14 may be machined or forged and then subsequently machined and is typically constructed of stainless steel or titanium. Nut retainer 16 may be forged and is typically constructed of corrosion resistant steel or a steel alloy. One embodiment of nut retainer may be made by Kaynar, Inc. of Fullerton, Calif.

Hardness of nutmount 10 can be determined with a Rockwell scale, which measures the indentation hardness of materials through the depth of penetration of an indenter. Nutmounts of the present invention may exhibit hardness measurements between about 25.0 HR and about 80.0 HR, typically between about 45.0 HR and about 60.0 HR.

Figure 3:
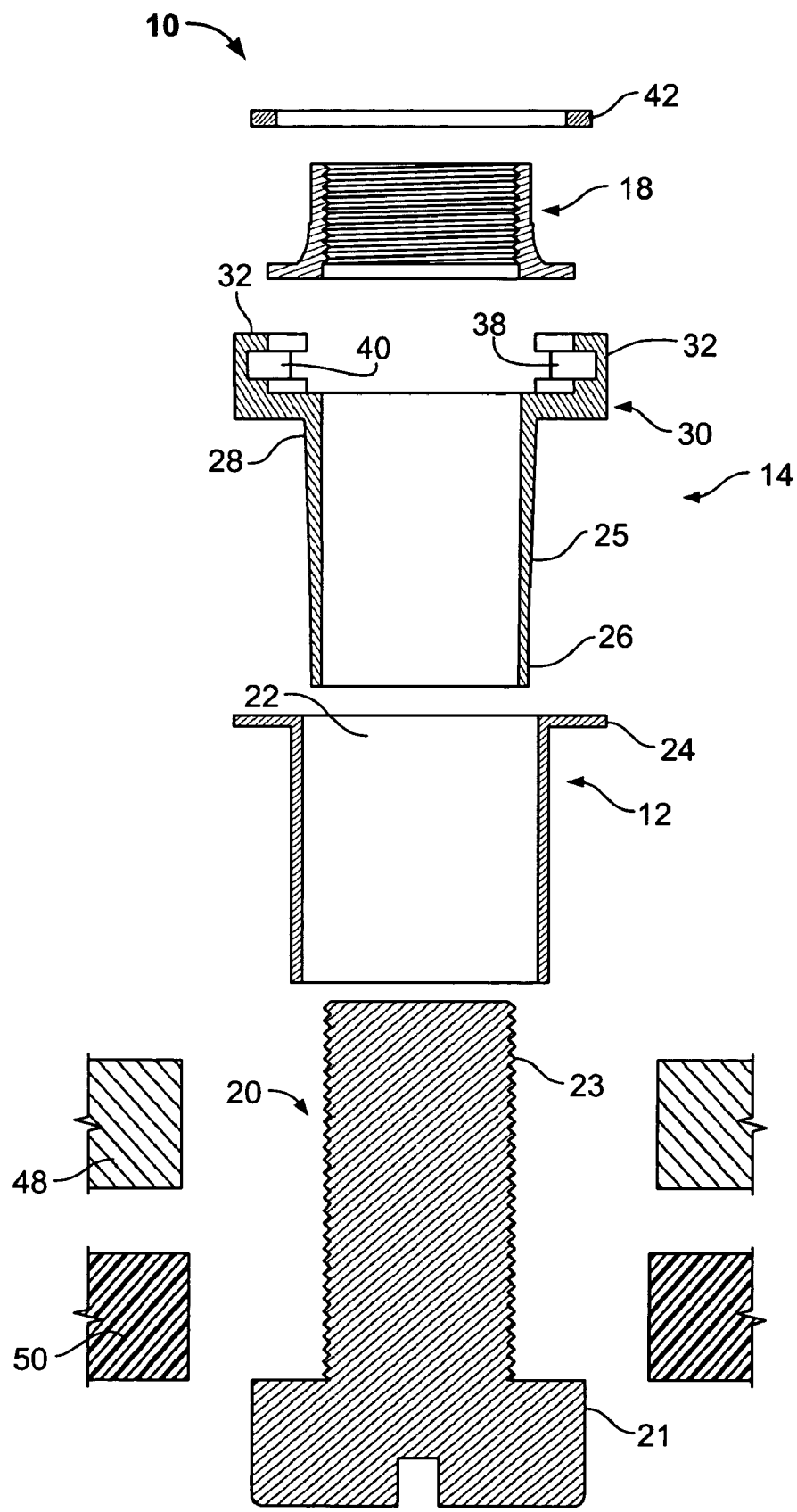
FIG. 3 is a front elevated cross-sectional view along a longitudinal axis of the nutmount apparatus of the present invention, with a schematic representation of first and second structures to be secured together.
Figure 4:
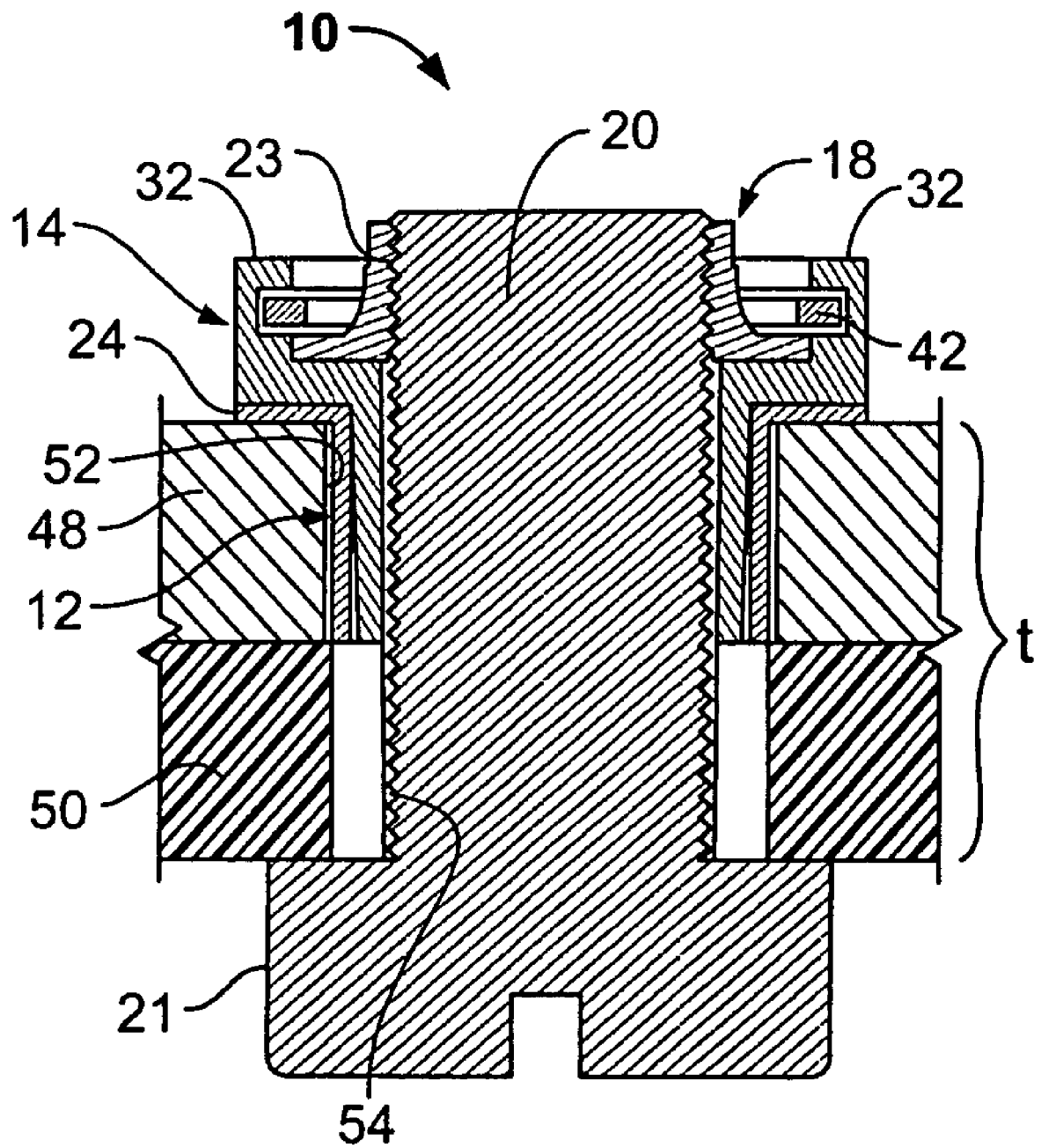
FIG. 4 is an assembled view of FIG. 3.

As shown in FIGS. 3 and 4, nutmount apparatus 10 may be used to secure a wide variety of structures 48 and 50 to one another. It can be used with metal members, composites and various structural plastics. Structures 48 and 50 may, for example, be aircraft structures, such as an aircraft wall and aircraft frame or the metal panels of the cargo floor or external surfaces of an airplane. The total thickness t of the two structures 48 and 50 is typically between about 0.1 inches and about 1.0 inches and nutmount apparatus may protrude from one side of the structures by about 0.25 inches to about 1.0 inch.

Opposing holes 52 and 54 are typically used to secure these structures and include diameters ranging from about 0.3 inches to about 0.60. Specific holes sizes include 0.311 inches, 0.375 inches, 0.4375 inches and 0.562 inches. Nutmount apparatus 10 may be inserted into one of holes 52 and 54. In one embodiment, nutmount apparatus 10 may be inserted into one of opposing holes 52 and 54 in pre-assembled form.

Alternatively, bushing 14 may be partially inserted into sleeve 12, followed by insertion into one of holes 52 and 54, with positioning of nut retainer 16 and nut element 18 on bushing 14 occurring next. To position nut retainer 16 and nut element 18 on bushing 14, opposing ends of base 19 of nut 18 are positioned within the open areas of bushing 14. A contracting force may then be applied to nut retainer 16, permitting opposing portions of flexible sidewalls 42 to move toward one another. With nut retainer 16 in this contracted position, flexible sidewalls 42 can now clear the interior dimension of opposing projections 32. Once nut retainer 16 is in alignment with the interior walls of projections 32, the contracting force can be released, allowing flexible sidewalls 42 to move apart and remain confined within recesses 38 and 40 or windows 34 and 36.

In still another embodiment, sleeve 12 may be inserted into one of opposing holes 52 and 54 first, followed by insertion of bushing 14, with or without nut retainer 16 and nut 18 in position. Clearance for insertion of nutmount apparatus into opposing holes is typically between about 0.002 inches and about 0.005 inches.

After nutmount apparatus 10 is inserted into one of opposing holes 52 and 54, an interference fit between portion 28 of bushing 14 and sleeve 12 may be created. In certain embodiments, bushing 14 is pulled into sleeve 12 (e.g., through use of a mandrel) or driven into sleeve (e.g., through use of a squeeze tool) to create the interference fit. This process may expand sleeve 12 as well as one of holes 52 and 54. Further, the process allows users to secure two structures 48 and 50 together from either side.

As shown in FIG. 4, the bottom portions of bushing 14 and sleeve 12 may be sub-flush with the bottom portion of one of structures 48 and 50. In other words, bushing 14 and sleeve 12 need not extend through both structures 48 and 50. To extent such extension is present, however, bushing 14 and sleeve 12 may be shaved with a mill tool or shaver to create the aforementioned sub-flush relationship.

Once nutmount apparatus 10 is in position, threaded screw or bolt 20 is placed through holes 52 and 54 and into threaded nut 18 to secure structures 48 and 50 together.

Variations, modifications and other implementations of what is described herein will occur to those of ordinary skill in the art without departing from the spirit and scope of the invention. Accordingly, the invention is in no way limited by the preceding illustrative description.

We claim

1. A nutmount apparatus comprising:
   an annular, non-tapered sleeve comprising a first flanged end, a first non-flanged end, and a first non-tapered central channel, extending between the first flanged end and the first non-flanged end, comprising a first diameter;
   a separate, tapered bushing comprising a second flanged end, a second non-flanged end, and a second tapered central channel, extending between the second flanged end and the second non-flanged end, wherein a second diameter of the second tapered central channel at the second flanged end exceeds the first diameter of the first non-tapered central channel of the annular, non-tapered sleeve, wherein the second non-flanged end is for insertion into the first non-tapered central channel from the first flanged end of the annular, non-tapered sleeve, and the second flanged end of the separate tapered bushing is for forcing the first flanged end of the annular, non-tapered sleeve to expand when the second non-flanged end of the bushing is inserted into the first non-tapered central channel of the annular, non-tapered sleeve; and
   a threaded nut positioned at an end of the sleeve or bushing.

2. The nutmount apparatus of claim 1, wherein the bushing further comprises opposing projections at the second flanged end, each projection including an inward recess extending from an inner surface of the projection towards the opposing projection.

3. The nutmount apparatus of claim 2, further comprising a retainer that engages the inward recess of each projection to be disposed between the inward recesses of the opposing projections and receives the threaded nut.

4. The nutmount apparatus of claim 3, wherein the retainer is positioned on the second flanged end of the bushing.

5. The nutmount apparatus of claim 1, wherein the bushing further comprises opposing projections, each projection including a window or slot.

6. The nutmount apparatus of claim 1, further comprising a threaded bolt or screw.

7. The nutmount apparatus of claim 6 wherein the nutmount apparatus is attaching multiple structural members together between a head of the threaded bolt or screw and a flange of the annular, non-tapered sleeve, wherein one of the structural members is abutted directly against the head of the threaded bolt or screw and another of the structural members is abutted directly against the flange of the annular, non-tapered sleeve.

8. The nutmount apparatus of claim 7 wherein the nutmount apparatus extends between holes of the structural members.

9. The nutmount apparatus of claim 8 wherein the larger second diameter of the separate, tapered bushing forced the annular sleeve and at least one of the holes of the structural members to expand when the tapered end of the separate, tapered bushing was inserted into the central channel of the annular, non-tapered sleeve.

10. The nutmount apparatus of claim 9 wherein the expansion occurred without the use of tools.

11. The nutmount apparatus of claim 1, wherein the second non-flanged end of the bushing when inserted into the first non-tapered central channel of the annular, non-tapered sleeve does not extend past the first non-flanged end of the sleeve.

12. The nutmount apparatus of claim 11, wherein the second non-flanged end of the bushing when inserted into the first non-tapered central channel of the annular, non-tapered sleeve ends at the first non-flanged end of the sleeve.

13. The nutmount apparatus of claim 1 wherein the first non-tapered central channel is linear.

14. The nutmount apparatus of claim 1 wherein the second tapered central channel is linear.

15. The nutmount apparatus of claim 1 wherein both of the first non-tapered central channel and the second tapered central channel are linear.

* * * * *

UNITED STATES PATENT AND TRADEMARK OFFICE
CERTIFICATE OF CORRECTION

PATENT NO. : 7,591,622 B2 Page 1 of 1
APPLICATION NO. : 11/188028
DATED : September 22, 2009
INVENTOR(S) : de Jesus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

Twenty-first Day of September, 2010

David J. Kappos
*Director of the United States Patent and Trademark Office*